United States Patent [19]

Mohammed

[11] Patent Number: 5,720,508

[45] Date of Patent: Feb. 24, 1998

[54] POWERED GLARE SCREEN DEVICE

[76] Inventor: Gaffar Mohammed, 3080 Peace Court, Windsor, Ontario, Canada, N8T 2J4

[21] Appl. No.: 544,529

[22] Filed: Oct. 16, 1995

Related U.S. Application Data

[63] Continuation-in-part of Ser. No. 206,391, Mar. 4, 1994, Pat. No. 5,443,300, and a continuation of Ser. No. 517,279, Aug. 21, 1995, abandoned.

[51] Int. Cl.[6] ............................................. B60J 3/02
[52] U.S. Cl. .................. 296/97.4; 296/97.8; 296/97.11; 160/37
[58] Field of Search .......................... 296/97.4, 97.5, 296/97.8, 97.11; 160/37

[56] References Cited

U.S. PATENT DOCUMENTS

| | | | |
|---|---|---|---|
| 2,559,471 | 7/1951 | Shrock | 296/97.11 |
| 4,765,675 | 8/1988 | Suensson | 296/97.4 |

FOREIGN PATENT DOCUMENTS

| | | | |
|---|---|---|---|
| 2445408 | 4/1975 | Germany | 296/97.11 |
| 67621 | 4/1986 | Japan | 296/97.11 |
| 182121 | 7/1989 | Japan | 296/97.4 |

*Primary Examiner*—Dennis H. Pedder
*Attorney, Agent, or Firm*—John R. Benefiel

[57] ABSTRACT

An automated glare screen device for automobiles includes a housing attachable above the windshield frame, with a tinted plastic glare screen panel power driveable is in and out of the housing to be selectively extended in front of the windshield. The drive includes a power screw shaft and a traveler sleeve drivingly connected to the glare screen panel so as to allow relative movement therebetween as the glare screen is driven. The housing is generally flat with a downwardly curved extension section engaging the glare screen panel as the glare screen panel is advanced out of the housing.

6 Claims, 3 Drawing Sheets

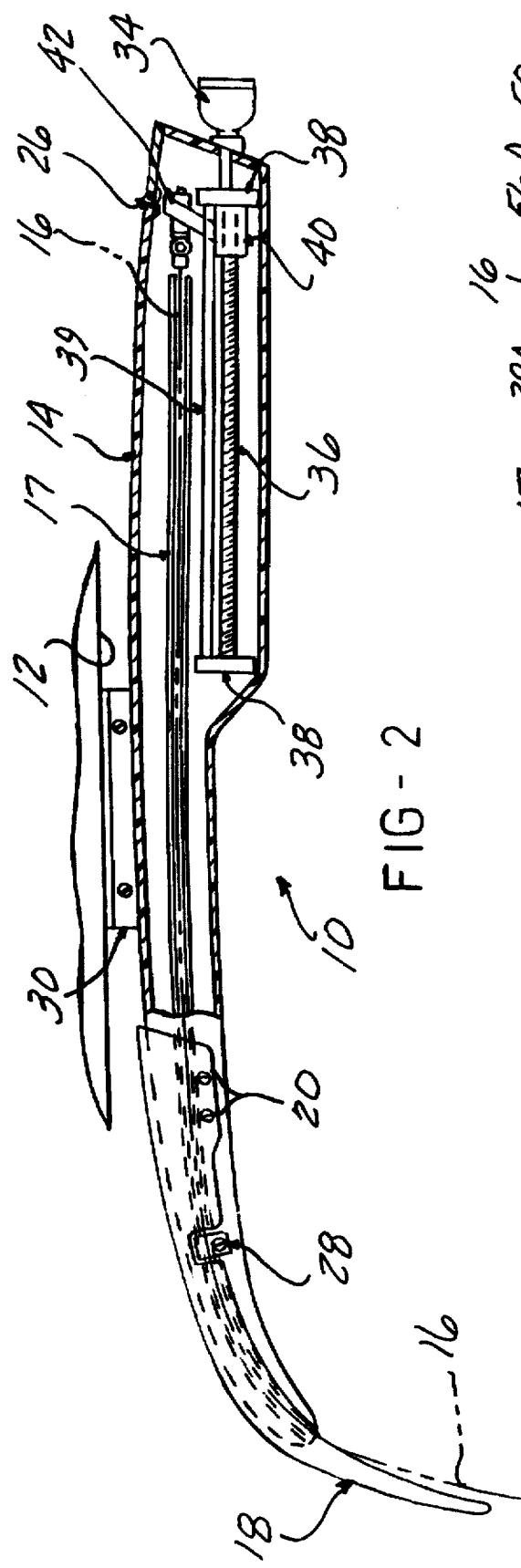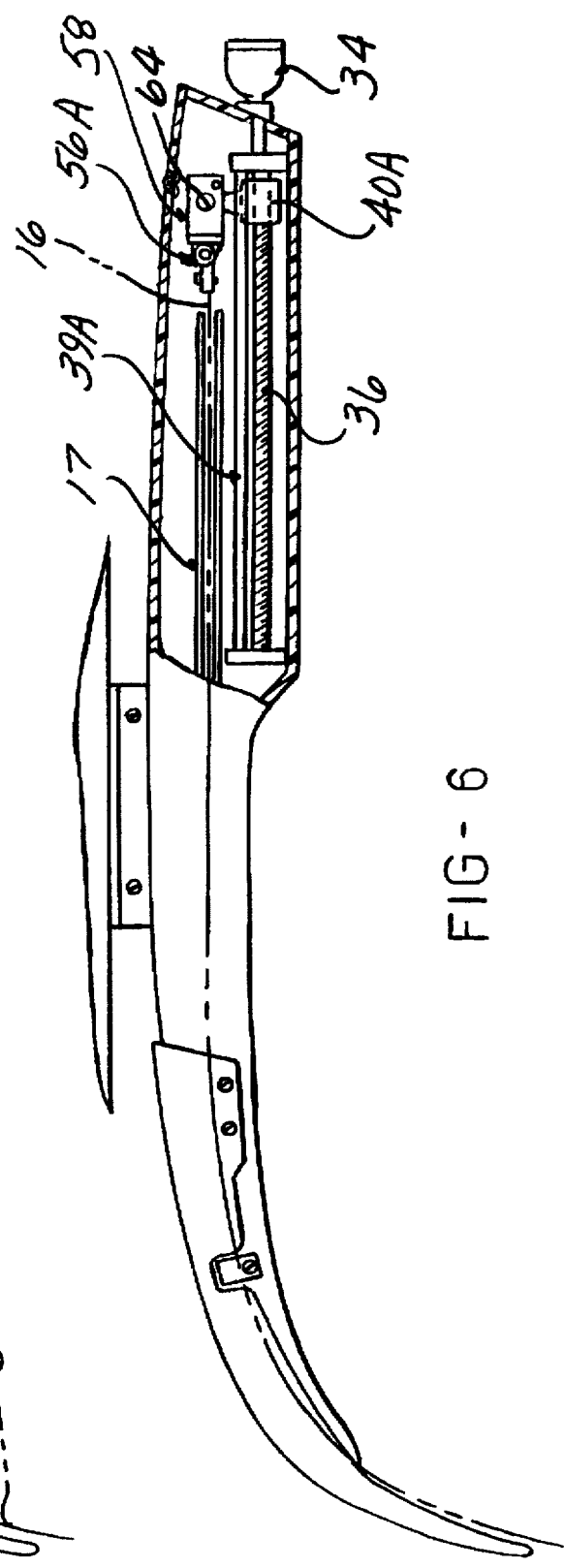

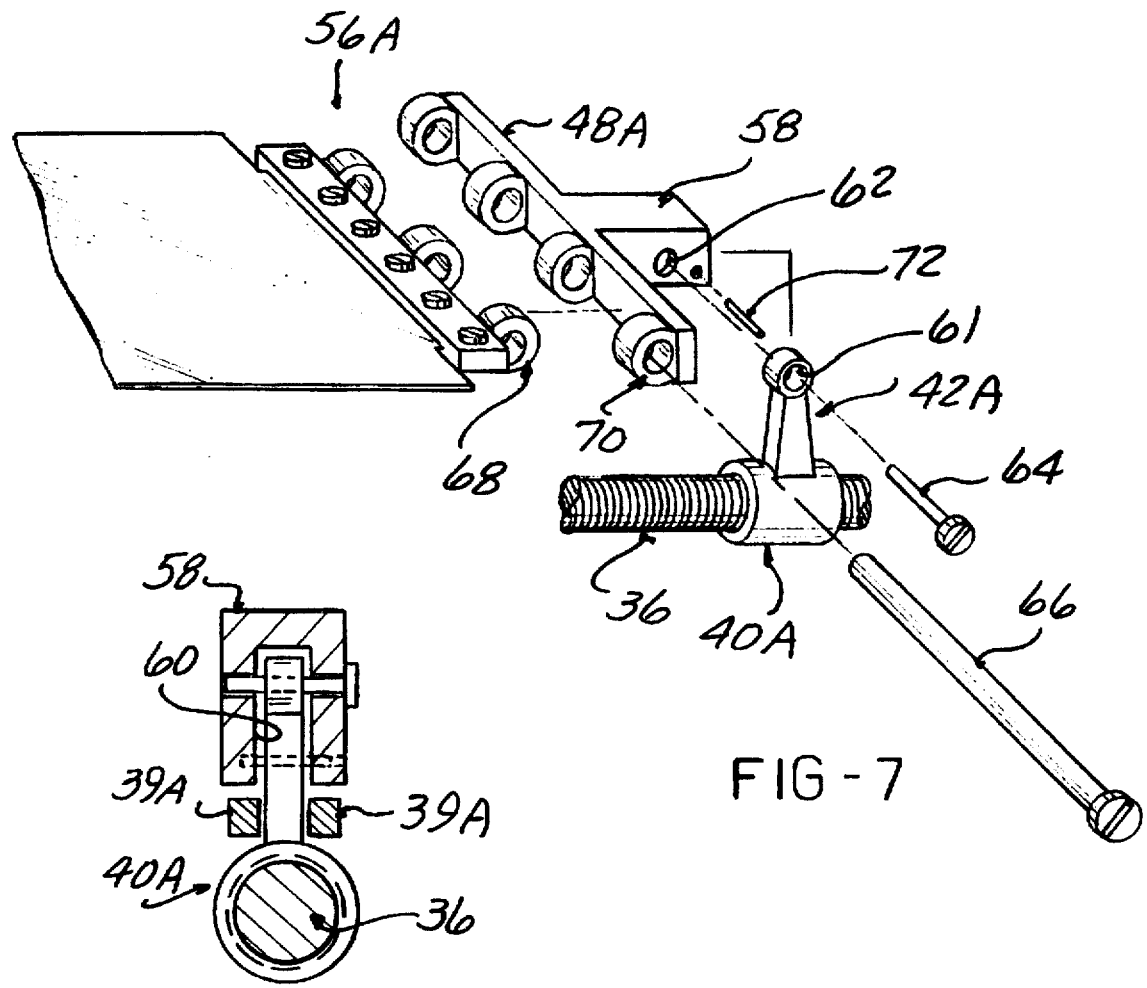
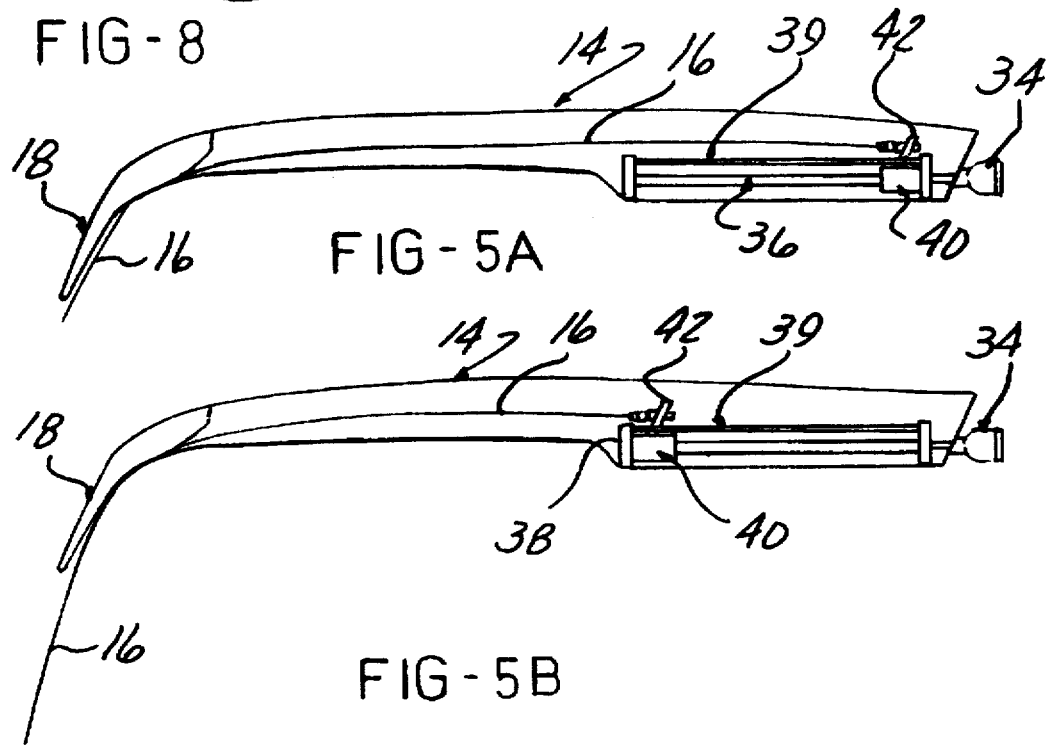

POWERED GLARE SCREEN DEVICE

CROSS-REFERENCE TO RELATED APPLICATION

This application is a continuation-in-part of U.S. Ser. No. 08/206,391, filed on Mar. 4, 1994, now U.S. Pat. No. 5,443,300, issued Aug. 22, 1995 and a continuation of U.S. Ser. No. 08/517,279, filed on Aug. 21, 1995, now abandoned.

BACKGROUND OF THE INVENTION

1. Field of the Invention

This invention concerns self powered, portable glare screens for automotive vehicles such as cars and trucks, and more particularly glare screens for the windshield or rear glass which are selectively extendible and retractable over the inside of the windshield.

2. Description of the Prior Art

The problem of eliminating glare for the driver (and passengers) of automotive vehicles has not heretofore been solved completely satisfactorily.

The most common solution has included fold down visors which are standard equipment on cars and trucks. When these are used, a substantial obstruction of the viewing area results. Tinting of the windshield is also widely practiced, but this is usually limited to the upper edges of the windshield lest the view be unduly darkened under nighttime or low light conditions.

The sun is often at low angles during commuting times of day, and the rays of the sun are often able to penetrate the glass below the tinting and create intense glare.

Numerous retractable glare screen devices have thus been proposed, some of which are powered, for example, see U.S. Pat. No. 5,076,633 issued on Dec. 31, 1991; U.S. Pat. No. 5,000,506 issued on Mar. 19, 1991; and U.S. Pat. No. 3,363,666 issued on Jan. 16, 1968.

These devices have not been completely satisfactory as being too complicated or bulky, inconvenient to use, or costly to manufacture and install, particularly when added as an accessory.

These above referred to devices firstly lack simplicity of design, and most importantly are complicated to install and thus are costly. The automobile must be substantially modified by the manufacturers to accommodate these complex devices, which in turn will increase the cost to the consumer. Secondly, these devices for the most part can only be factory installed in new automobiles, and when once installed, can only be used for that particular vehicle. Thus, when buying another car, the consumer has to again pay for a new glare screen and the cost keeps adding on. The prior devices are intended for new vehicles only, and are not feasible to install in existing cars.

In copending application U.S. Ser. No. 08/206,391, a sprocket drive mechanism for the glare screen is described.

The object of the present invention is to provide an improved drive for a portable powered glare screen device, which drive is compact and reliable.

SUMMARY OF THE INVENTION

The present invention is a glare screen device comprised of a hollow housing adapted to be installed on the inside of the auto roof above the windshield header. The housing holds a glare screen panel which projects a few inches when retracted, but which panel may be power driven so as to be extended out of the housing in use, descending to a point where it covers a major portion of the vehicle windshield.

The glare screen panel itself is sufficiently stiff to be self supporting and is darkly tinted on the top portion and gradually lightens up towards the screen leading edge to be effective in bright sunlight.

The improved power drive for the glare screen panel comprises an elongated power screw shaft which has a driven traveler sleeve pivotally connected to one end of the glare screen so as to power the advancing and retracting movement of the glare screen by rotation of the screw shaft. In one embodiment, a pedestal is pinned in a slot in a connector block hinged to the glare screen.

In a second embodiment, a slot in a connector bar fixed to the traveler sleeve confines a post hinged to the glare screen, allowing up and down movement which, together with the hinge connected between the post and the glare screen, accommodates the change in vertical position of the glare screen end as it is advanced and retracted with respect to the housing.

A positive stop arrangement limits advancing and retracting of the glare screen panel.

The housing may be generally flat, and a downwardly curved end extension section is attached to provide a dark-tinted, housing glare screen which also functions to deflect and guide the retractable glare screen panel as it is driven out of the housing.

DESCRIPTION OF THE DRAWINGS

FIG. 2 is a longitudinal sectional view taken through the glare screen device according to the invention shown in FIG. 1.

FIGS. 5A and 5B are diagrammatic side elevational views of the drive mechanism of the glare screen device shown in FIGS. 1 and 2 showing the respective fully retracted and fully advanced positions of the glare screen.

FIG. 6 is a longitudinal partially sectional view of a second embodiment of the drive mechanism shown installed in the glare screen housing.

FIG. 7 is a partially exploded perspective view of certain of the components of the drive shown in FIG. 6.

FIG. 8 is a transverse sectional view taken through the drive components shown in FIG. 7.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
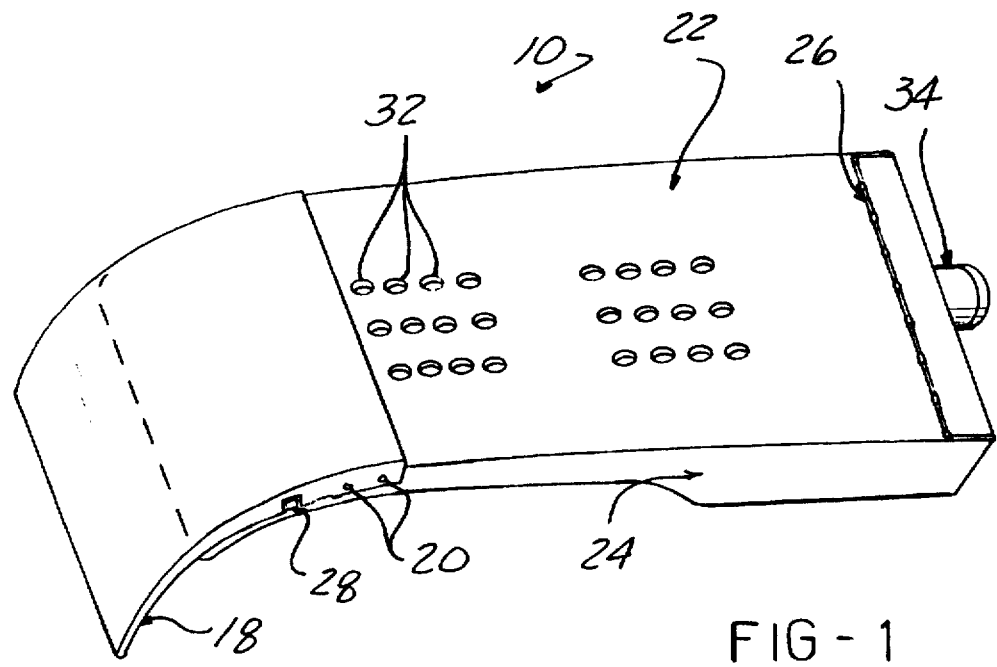
FIG. 1 is a perspective view of an automobile glare screen device according to the present invention.
Figure 3:
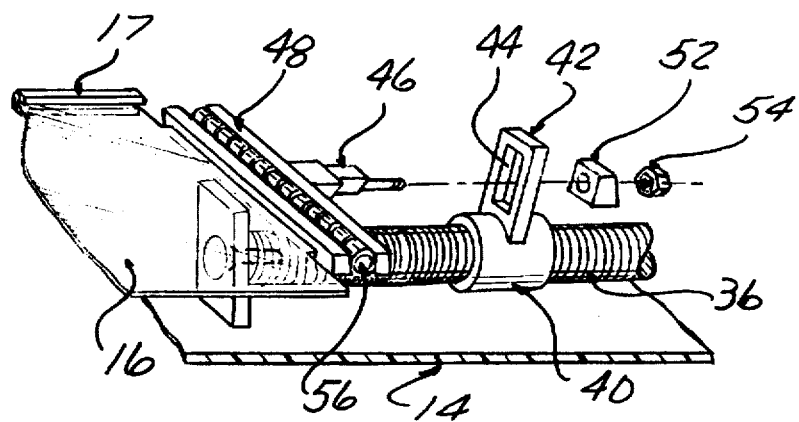
FIG. 3 is a partially exploded and fragmentary perspective view of certain of the drive components of the device shown in FIGS. 1 and 2.
Figure 4:
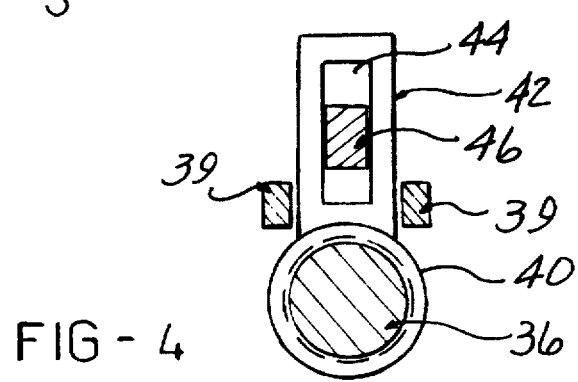
FIG. 4 is a transverse sectional view taken through certain drive components shown in FIG. 3.
Figure 4A:
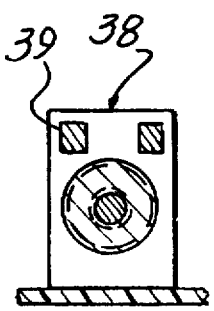
FIG. 4A is a transverse sectional view taken through certain drive components shown in FIG. 2.

Referring to the drawings and particularly FIGS. 1 and 2, a glare screen device 10 is adapted to be installed on the inside of the vehicle roof 12, just to the rear of the vehicle windshield and above the windshield header (not shown).

Each device 10 includes a housing 14 which contains a glare screen panel 16 which may be selectively driven to an extended position to cover a substantial portion of the windshield. The movement of the glare screen panel 16 is guided by tracks 17 on each side of the inside of the housing 14.

The housing 14 has a downward curved extension section 18 attached with screws 20. The extension 18 is constructed of darkened transparent or translucent plastic so that the top portion of the windshield is covered, to serve the function of a tinted portion of the windshield which tinting can therefore be dispensed with. The inside of the extension section 18 also acts to deflect and guide the leading edge of the glare screen panel as it is advanced out of the housing 14. This extension section 18 may be employed with the glare screen device described in applicant's prior application, now U.S. Pat. No. 5,443,300.

The present device will also allow elimination of visors, so that together with the elimination of the tinted windshield, considerable cost saving results.

The glare screen panel 16 is constructed of a self supporting sheet of transparent but darkly tinted plastic, darkest at the top and which gradually lightens up towards the lower edge. The plastic should be resistant to solar radiation, acrylic plastic being one suitable material.

The housing 14 may be constructed of two parts of molded plastic, a lid 22 and a body portion 24 held together with a hinge 26 at the rear and tabs 28 at the forward sides. The exterior of the housing parts preferably have a rubberized coating to minimize the bumping hazards presented by its presence.

The housing 16 is removably attachable to the inside of the roof 12 by means of a magnetic bracket 30.

Vent holes 32 are formed in the lid 22 to prevent heat buildup in the housing interior.

An improved drive mechanism is provided for powered movement of the glare screen panel 16 between an extended and a retracted position as described.

The drive mechanism includes a reversible electric motor 34, selectively controlled by a reversing on-off switch (not shown) located for convenient operation.

The drive motor 34 is directly connected to a power screw shaft 36 supported on spaced bearing posts 38 at either end located within the housing 14 so that the shaft 30 extends in the same direction as the movement of the glare screen 16.

A traveler sleeve 40 is threadably received on the screw shaft 36 such as to be axially advanced or retracted when the shaft 36 is rotated in either direction. Traveler sleeve 40 is restrained from rotating in order to enable axial movement as well as to be connected to the glare screen panel 16 by an upwardly extending rectangular post 42 fixed to the sleeve 40, slightly inclined to the rear. A vertical slot 44 receives a square rod 46 integral with a hinge bar 48.

A pair of parallel guide bars 39 are affixed at either end to bearing posts 38, straddling the rectangular post 42 to guide and limit the side-to-side motion of the post 42.

A threaded pin 50 axially projects from the rod 46, received in a bore in a holder block 52 with a nut 54 securing the post 42 in engagement with the rod 46.

A hinge 56 interconnects the hinge bar 48 to the inside edge of the glare screen panel 16 to allow a degree of tilting as the glare screen panel 16 is driven along the tracks 17 by the post 42.

The square shaft 46 is also allowed to move up or down in the slot 44 so that changing alignments are accommodated, as the sleeve 40 moves along the screw shaft 40, as shown in FIGS. 5A and 5B.

FIGS. 6–8 show a variation of the pivotal connection in which a hinge bar 48A has an axially projecting bar 58 formed with a slot recess 60 receiving a post 42A integral with the traveler sleeve 40A.

The post 42A has a pivot bore 61 aligned with a cross bore 62 machined in the bar 58 receiving a clevis pin 64 to establish a pivotal connection between the post 42A and hinge bar 48A.

Guide bars 39A are provided as in the above-described embodiment.

The hinge 56A is shown as a loose pin design, in which a hinge pin 66 interconnects interleaved hinge sections 68, 70 connected respectively to the hinge bar 48A and the glare screen panel 16, as shown in FIG. 7.

A stop pin 72 limits tilting of the hinge bar 48A about pivot pin 64.

This embodiment allows tilting about two axes as the glare screen panel 16 is advanced and retracted by movement of the traveler sleeve 40A along the screw shaft 36, to accommodate the changing angle of the glare screen panel with the screw shaft 36.

The above-described drive mechanisms are simple and more compact than that described in the present inventor's copending application and hence is preferred.

The housing extension 18 may also be used with the versions of applicant's powered glare screen device described in the copending application cross-reference above, and could be made integral rather than a separate, detachable section.

The compact but reliable drive mechanism can be manufactured at low cost, and the devices can be removed for use in another vehicle.

I claim:

1. A portable, self-contained glare screen device for automotive vehicles such as cars and trucks comprising:

a hollow housing;

attachment means for attaching said housing within the passenger compartment of an automotive vehicle above a glass window to be screened against glare;

a tinted glare screen panel sufficiently stiff to be self supporting and mounted for movement in and out of a slot in said housing, from an extended position to a retracted position;

a drive mechanism including a selectively energizable reversible electric drive motor, an elongated power screw shaft rotatably mounted in said housing extending lengthwise in the direction of said movement of said glare screen, said drive motor connected to said screw shaft, a traveler sleeve threadably engaged with said screw shaft, means drivingly connecting said traveler sleeve to said glare screen panel so as to cause driving of said glare screen panel in and out of said housing by rotation of said screw shaft and axial movement of said traveler sleeve;

said means drivingly connecting said traveler sleeve and said glare screen panel including a post attached to said traveler sleeve and also including a hinge interconnecting said glare screen panel and said post;

said means drivingly connecting said traveler sleeve and said glare screen panel further including a hinge bar and a connection between said hinge bar and said post allowing relative movement therebetween.

2. A glare screen device according to claim 1 wherein said housing is generally flat but with an extension section at an end thereof where said panel is curved downwardly when installed on said inside of said roof of said automotive vehicle.

3. A glare screen device according to claim 1 further including a slotted track guide in said housing on either side of the inside of said housing receiving a respective side edge of said glare screen panel.

4. A glare screen device according to claim 1 wherein said connection comprises an elongated vertical slot and a bar moving in said slot to allow relative up and down movement while said glare screen panel is driven.

5. A glare screen device according to claim 1 wherein said connection comprises a pivot joint allowing relative pivoting as said glare screen panel is driven by both said pivot connection and said hinge.

6. A powered glare screen device for the windows of an automotive vehicle comprising a generally flat housing, glare screen panel mounted within said housing for powered movement in and out of an opening in one side of said housing, by a drive means in said housing;

a deflector section detachably curving from said one end of said housing, downwardly curving from said opening to deflect said glare screen panel downwardly after said glare screen panel exits said opening, said extension section constructed of a darkly tinted plastic able to transmit light.

* * * * *